United States Patent [19]

James et al.

[11] Patent Number: 5,239,476

[45] Date of Patent: Aug. 24, 1993

[54] MULTI-LEVEL STATE LANGUAGE CONTROLLER FOR MULTI-THREADED MACHINE CONTROL

[75] Inventors: Lewis G. James, Clarence; Valentine L. Burke, East Aurora; Kenneth M. Poczciwinski, Cheektowaga, all of N.Y.

[73] Assignee: Strippit, Inc., Akron, N.Y.

[21] Appl. No.: 679,516

[22] Filed: Apr. 2, 1991

[51] Int. Cl.⁵ .................... G06F 15/46; G05B 11/01
[52] U.S. Cl. ........................... 364/474.01; 364/140; 364/143
[58] Field of Search ............ 364/474.01, 140, 141, 364/142, 143, 136, 147, 228.7; 395/275, 379, 725

[56] References Cited

U.S. PATENT DOCUMENTS

| | | |
|---|---|---|
| 3,746,845 | 7/1973 | Hanegar et al. |
| 4,138,718 | 2/1979 | Toke et al. |
| 4,149,235 | 4/1979 | Froyd et al. |
| 4,477,754 | 10/1984 | Roch et al. |
| 4,636,938 | 1/1987 | Broome |
| 4,723,207 | 2/1988 | Isobe et al. |
| 4,779,205 | 10/1988 | Kitamura |
| 4,907,163 | 3/1990 | Cook |
| 4,991,077 | 2/1991 | Kawasaki et al. |
| 5,072,356 | 12/1991 | Watt et al. ............... 364/140 |
| 5,093,772 | 3/1992 | Senda et al. ............. 364/140 |
| 5,097,405 | 3/1992 | Sato ......................... 364/140 |

Primary Examiner—Jerry Smith
Assistant Examiner—Jim Trammell
Attorney, Agent, or Firm—Hill, Steadman & Simpson

[57] ABSTRACT

A control system for an NC machine incorporates a personal computer and an auxiliary control having an auxiliary microprocessor connected together and with the machine, via communication channels The personal computer and auxiliary controller are both provided with apparatus for controlling operations in a plurality of sequences, all of which run simultaneously, without requiring any modification in the normal operating system of the personal computer. The control program of the auxiliary controller is downloaded from the personal computer, and the sequences in both contain a number of consecutive states for each sequence, with each state characterized by one or more instructions and an operational time. One state of each sequence is designated the current state and the instruction of the current state of each sequence is performed in consecutive order, except when a priority instruction is recognized, after which the instruction of consecutive states of a single sequence are performed successively until a priority halt instruction is recognized. The auxiliary controller can operate autonomously to facilitate time-critical control operations without delays imposed by the need to communicate with the personal computer, but the personal computer can communicate with the auxiliary controller on demand for supervision and control when necessary or desired.

3 Claims, 17 Drawing Sheets

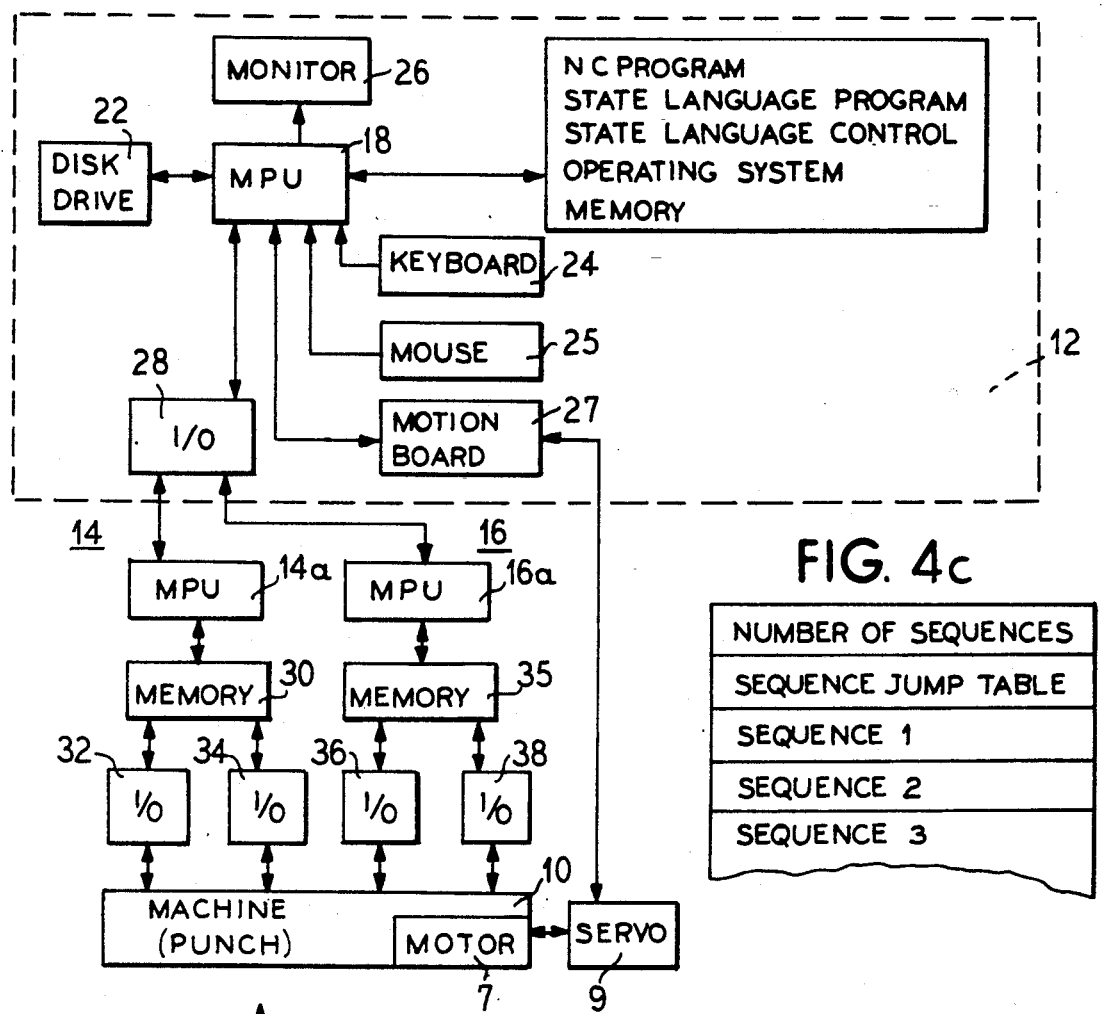
FIG. 1
FIG. 4c
| NUMBER OF SEQUENCES |
| SEQUENCE JUMP TABLE |
| SEQUENCE 1 |
| SEQUENCE 2 |
| SEQUENCE 3 |
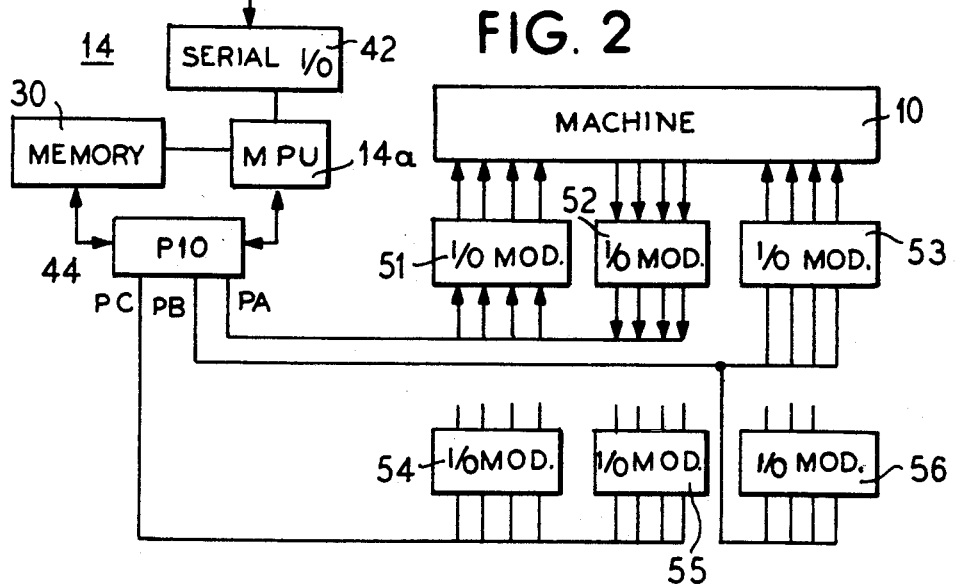
FIG. 2

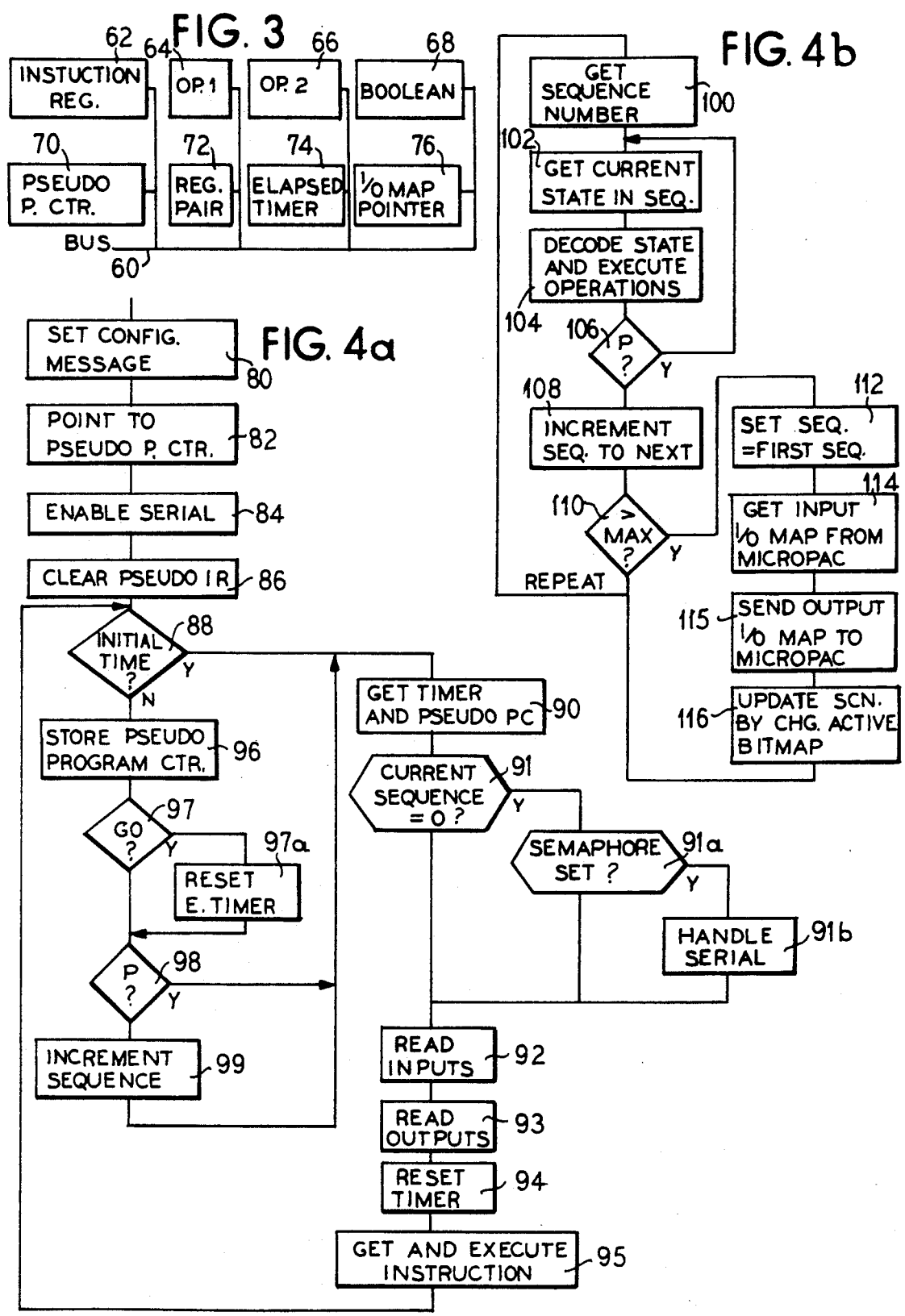

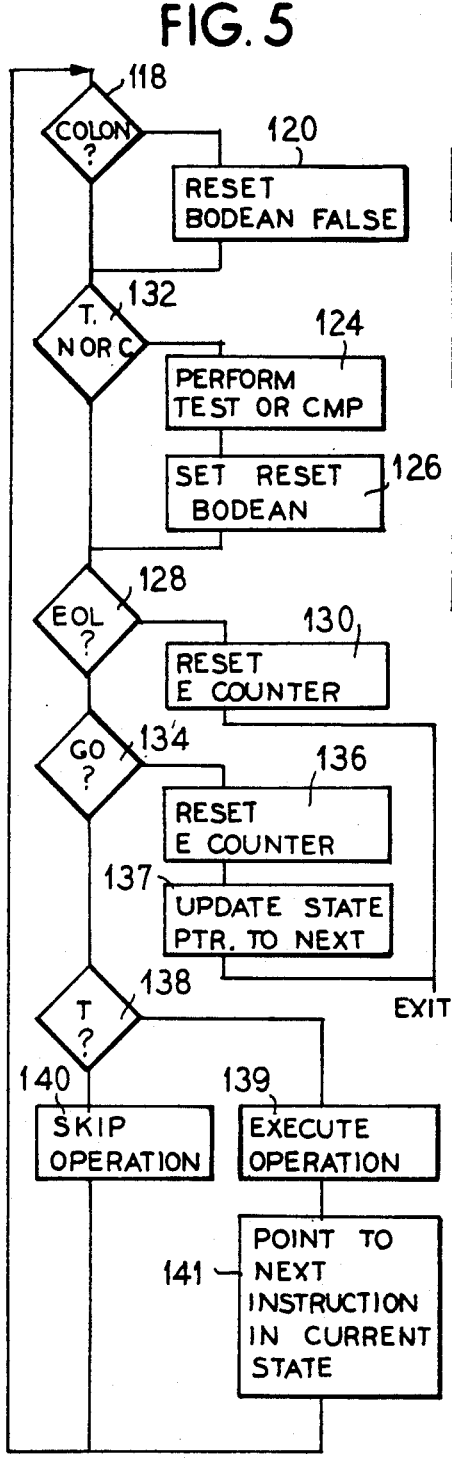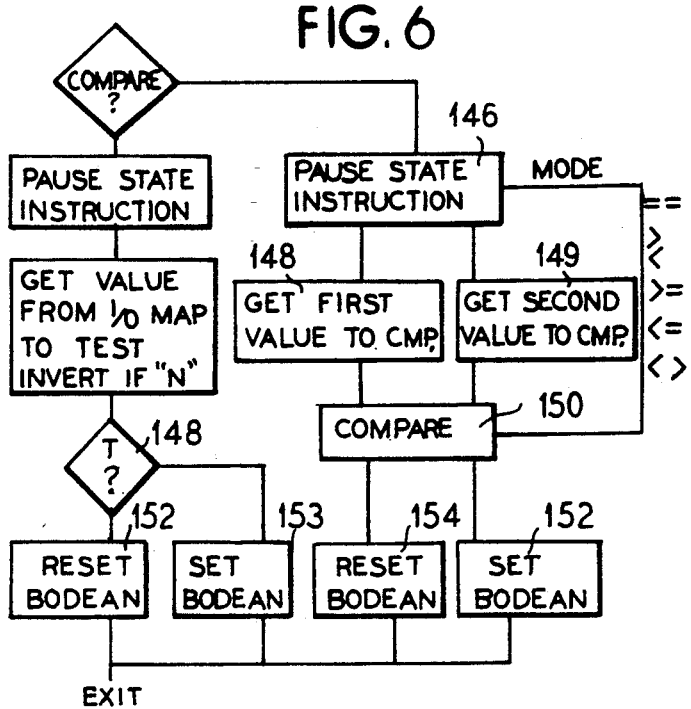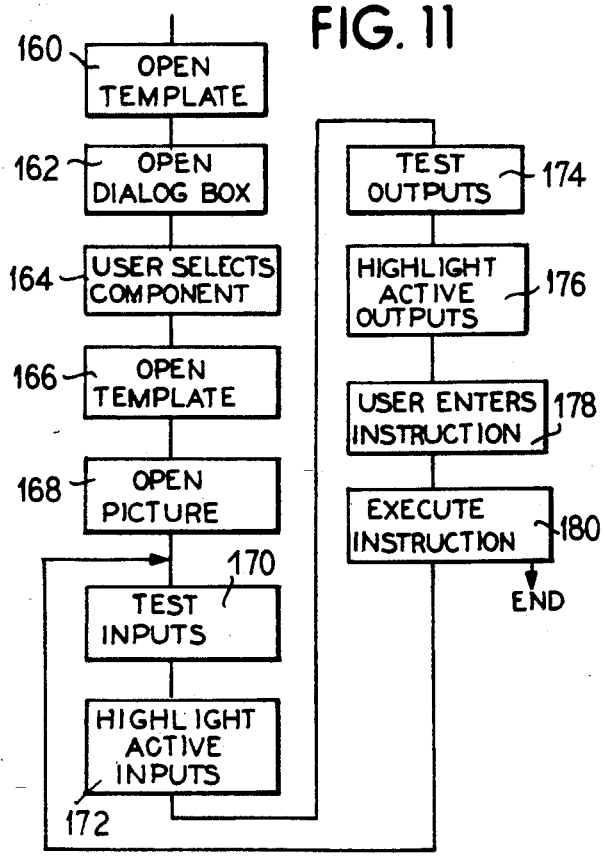

FIG. 8

```
************************************************************************
*                         CNC Emulation Program
*
*   This state language program emulates a CNC for a simple one axis machine. It
*   can select and read an NC program and then execute it. Execution begins by
*   pushing the Start soft key and will end by pushing the Stop soft key. A new NC
*   program may be selected by pushing the Select softkey, but only when the Cycle
*   On picture is off. A Punch picture is also displayed for one second after every
*   X move to demonstrate the way operations may be synchronized with motion.
*
************************************************************************
*
*       Initialization state machine
*
*               opentemplate
1.1:            R[T,":CNC:CNC Support:TOP.tpl"]G10
*               clearmessage
1.10:           W[19,""]D[D,O,19]D[P,O,1]P[S]G30
*
*       InitializemotioncontrolXaxis
*               disableXhome
1.30:           M[H4B,4,0]G40
*               polarityXhome(inverting),fwd-rev lim sw's(inverting)
1.40:           F[VG13=1024+512+32+16+8+4+2+1]M[H4A,4,VG13]G50
*               I/Oportbits 1,2,3 as outputs and bits 4,5,6 as inputs
1.50:           F[VG13=32+16+8]M[H44,4,VG13]G60
*               polarity of I/O port outputs 1,2,3,4,5,6 all low
1.60:           M[H45,4,0]G70
*               disable I/O port trigger inputs
1.70:           M[H46,4,0]G80
*               posoffset=0
1.80:           M[H68,1,0]G90
*               inchscalingfor1024countencoder&12mmpitchleadscrew
1.90:           M[H69,1,2048,1875]G100
*               absolutemode
1.100:          M[H64,1,0]G110
*               deceleratedstopmode(1=decelmode,2=stopquick)
1.110:          M[H55,1,1]G120
*               filtersampleperiod  proportional   derivative integral   :limit
1.20:           M[H57,1,1]        M[H58,1,10]  M[H5A,1,0]     M[H59,1,0]M[H5B,1,20]G130
*               posreg=0
1.130:          M[H4E,1,0]G140
*               setXtargetvelocity(encodercounts*velocity(imp)/velocityfactor)
1.140:          F[VG14=1024*100/VG146]M[H4F,1,VG14]G150
*               setXtargetacceleration
1.50:           F[VG230=6*2048/1875]F[VG13=VG230*80]M[H62,1,VG13]G160
*               resetpos       startmove          stopmove
1.60:           M[H50,1]       M[H61,1,X] M[H4C,1]G170
*               maxposerrorcount        run/stopmask
1.70:           M[H56,1,VG140]          M[H6B,1,2]G180
*               setmaxmoveto50inches
1.180:          F[VG171=50000]F[VG173=0-1000]G200
*
1.200:          P[H]G220
*
*       Openmini-findertoselectanNCprogram
*               selectprogram
```

FIG. 9

```
1.220:     F[VG100=0]R[F,$10]:G230
*          errorfrommini-finder
1.230:     C[VG100<>0]W[19,"File error"]G240:G250
*          wait3seconds
1.240:     E30G220
*          waitforkeystorelease
1.250:     N[505-507]D[P,0,2]W[19,"NC Program:",$10]G260

*     DisplayPosition&NCprogram
*          displayXaxisdecodedposition
1.260:     W[11,"X ";%VG65]D[D,0,11]D[D,0,2-8]G270
*          displayNCprogram
1.270:     W[2,$29]W[3,$30]W[4,$31]W[5,$32]W[6,$33]W[7,$34]W[8,$35]G280
*          waitforProgramkey&Cycleoff
1.280:     T505N3G290
*          waitforkeystorelease
1.290:     N[505-507]G220
*
****************************************************************
*     Automaticcyclestatemachine
*
*          I/O       Description
*
*          1         Softkeys
*          2         Softkeylabels
*          3         CycleOn
*          4         Punch
*          5         Cyclestop
*
*          CycleStartkey      turnonCycleOnpicture  turnoffCycleOnpicture
2.1:       T506               L3D[P,0,3]G10:        U3D[P,C,3]
*          waitforkeystorelease
2.10:      N[505-507]U5G20
*
*     Cycleloopstarthere
*          noCyclestopthendecodeNCblock
2.20:      N5R[B,0,T]G30:    G1
*          blockerrorthendisplaymessage
2.30:      C[VG100<>0]W[19,"File error",VG100]G1:G40
*          Xstopped
2.40:      M[H41,4]N422G40:G50
*          Xnotdecodedthentakeashortcut
2.50:      N1068G130:G60
*          Punchstoppedgointoprioritymode
2.60:      N4P[S]G100
*
*     Setupmove
*          display decodedposition
2.100:     W[11,"X";%VG65]G110
*          Loadtargetpos      startmove
2.110:     M[H4E,1,VG69]      M[H61,1]G120
*          displayNCblocksandleaveprioritymode
2.120:     W[2,$29]W[3,$30]W[4,$31]W[5,$32]W[6,$33]W[7,$34]W[8,$35]P[H]G130
*
*     StartPunch
*          X in position
2.130:     M[H41,4]N422G130:G140
```

FIG 9a

```
*          Xmoverequiredforpunch
2.140:     T1068L4:    G150
*
*          Endofblockprocessing
*                notProgramendthenadvanceblock
2.150:     N1317R[B,1,F]:G20
*
*
**********************************************************************
*          LatchCycleStopatanytime
*                CycleStop
3.1:       T507L5
*
*
**********************************************************************
*          OperatePunchafteryeveryXmovewhilethenextNCblockisbeingdecoded
*                Punch on
4.1:       T4D[P,0,4]G10
*          turnPunchpictureoffafter1second
4.10:      E10U4D[P,C,4]G1
```

The chart below should read from top to bottom. A description of the operations performed at various layers should give a good idea how the CNC PAL program listed above is executed while run a hypothetical NC program with two blocks in it.

NC Program:
    X10.
    X20.

Each page of the chart below represents at least one scan through all the state machines.

FIG. 10b

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.10: N[505-507] (START key=true.) U5G20 (Boolean 5=on, current state=20.) | | |
| | | Next state machine | | | |
| | | | Line 3.1: T507 (STOP key=false.) | | |
| | | Next state machine. | | | |
| | | | line 4.1: T4 (Boolean 4=false.) | | |
| | | Update memory map and sent it to MicroPACs. | | | |
| | Serial port driver. | | | | |
| Serial port. | | | | | |
| | | Update screen button 506. | | | |
| | QuickDraw. | | | | |
| Display memory. | | | | | |

FIG. 10c

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.0: N5 Boolean 5=false, R[B,O,T]G30 (Read & decode current NC block, current state=30.) | | |
| | | Next state machine | | | |
| | | | Line 3.1: T507 (STOP key=false.) | | |
| | | Next state machine. | | | |
| | | | line 4.1: T4 (Boolean 4=false.) | | |
| | | Update memory map and sent it to MicroPACs. | | | |
| | Serial port driver. | | | | |
| Serial port. | | | | | |
| | | 1st state machine. | | | |
| | | | line 1.280:T505 (SELECT key=false.) | | |
| | | Next state machine. | | | |
| | | | line 2.30: C[VG100<>O] (Compare=false.) G40 (Current state=40.) | | |
| | | Next state machine. | | | |
| | | | line 3.1: T507 (STOP key=false.) | | |
| | | Next state machine. | | | |
| | | | line 4.1: T4 (Boolean 4=false.) | | |
| | | Update memory map and send it to MicroPACs. | | | |
| | Serial port driver. | | | | |
| Serial port. | | | | | |

FIG 10d

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.40: M[H41,4] (M command=true.) N422 (Motion=false.) G50 (Current state=50) | | |
| | | Next state machine | | | |
| | | | Line 3.1: T507 (STOP key=false.) | | |
| | | Next state machine. | | | |
| | | | line 4.1: T4 (Boolean 4=false.) | | |
| | | Update memory map and sent it to MicroPACs. | | | |
| | Serial port driver. | | | | |
| Serial port. | | | | | |
| | | 1st state machine. | | | |
| | | | line 1.280:T505 (SELECT key=false.) | | |
| | | Next state machine. | | | |
| | | | line 2.50: N1068 (X not decode=false.) G60 (Current state=60.) | | |
| | | Next state machine. | | | |
| | | | line 3.1: T507 (STOP key=false.) | | |
| | | Next state machine. | | | |
| | | | line 4.1: T4 (Boolean 4=false.) | | |
| | | Update memory map and send it to MicroPACs. | | | |
| | Serial port driver. | | | | |
| Serial port. | | | | | |

FIG 10e

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.60: N4 (no Boolean 4=true.) P[S]G100 (Priority mode, Current state = 100.) | | |
| | | Current state. | | | |
| | | | line 2.100: W[11,...] (Display X position.) G110 (Current state=110.) | | |
| | | Current state. | | | |
| | | | line 2.110: M[H4E,...] (Load X position.) M[H61,1] (Start X move.) G120 (Current state=120.) | | |
| | | Current state. | | | |
| | | | line 2.120: W[2,... (Display NC blocks.) P[H]G100 (Leave priority mode, (Current state=130.) | | |
| | | Next state machine. | | | |
| | | | line 3.1 T507 (STOP key=false.) | | |
| | | Next state machine. | | | |
| | | | line 4.1: T4 (Boolean 4=false.) | | |
| | | Update memory map and send it to MicroPACs. | | | |
| | Serial port driver. | | | | |
| Serial port. | | | | | |
| | | Update write boxes 2-8 & 11. | | | |
| | QuickDraw. | | | | |
| Display memory. | | | | | |

FIG 10f

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.130: M[H41,4] (M command=true.) N422 (Motion=false.) G140 Current state=140.) | | |
| | | Next state machine. | | | |
| | | | line 3.1: T507 (STOP key=false.) | | |
| | | Next state machine. | | | |
| | | | line 4.1: T4 (Boolean 4=false.) | | |
| | | Update memory map and send it to MicroPACs. | | | |
| | Serial port driver. | | | | |
| Serial port. | | | | | |

FIG 10g

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.140: T1068 (Boolean 1068=true.) L4 (Set Boolean 4=true.) G150 (Current state=150.) | | |
| | | Next state machine. | | | |
| | | | line 3.1: T507 (STOP key=false.) | | |
| | | Next state machine. | | | |
| | | | line 4.1: T4 (Boolean 4=true.) D[P,O,4]G10 (Picture 4=on, current state=10.) | | |
| | | Update memory map and send it to MicroPACs. | | | |
| | Serial port driver. | | | | |
| Serial port. | | | | | |
| | | Update picture 4. | | | |
| | QuickDraw. | | | | |
| Display memory. | | | | | |

FIG 10h

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.150: N1317 (not program end=true.) R[B,1,F] (Advance to next NC block.) | | |
| | | | | | X20. (2nd NC block.) |
| | | | G20 (Current state=20.) | | |
| | | Next state machine. | | | |
| | | | line 3.1: T507 (STOP key=false.) | | |
| | | Next state machine. | | | |
| | | | line 4.10: E10 (.1 sec timer=false.) | | |
| | | Update memory map and send it to MicroPACs. | | | |
| | Serial port driver. | | | | |
| Serial port. | | | | | |

FIG 10i

| Computer Hardware | Operating System | PAC | PAL | MicroPAL | NC |
|---|---|---|---|---|---|
| | | 1st state machine. | | | |
| | | | line 1.280:T505 (SELECT Key=false.) | | |
| | | Next state machine. | | | |
| | | | line 2.20: N5 (Boolean 5=false.) R[B,O,T]G30 (Read & decode current NC block, Current state=30.) | | |
| | | Next state machine. | | | |
| | | | line 3.1: T507 (STOP key=false.) | | |
| | | Next state machine. | | | |
| | | | line 4.10: E10 (.1 sec timer=false.) | | |
| | | Update memory map and send it to MicroPACs. | | | |
| | Serial port driver. | | | | |
| Serial port. | | | | | |
| | | 1st state machine. | | | |

MULTI-LEVEL STATE LANGUAGE CONTROLLER FOR MULTI-THREADED MACHINE CONTROL

FIELD OF THE INVENTION

The present invention relates to machine tool control systems, and more particularly to a programmable automation control system.

BACKGROUND OF THE INVENTION

In the past, dedicated embedded controls called CNCs (computer numerical controls) have been used to control physical machinery of various types, such as machine tools, punch equipment, and the like. Common features of these physical machines require the ability of the CNC to read various switches, and drive various physical machine actuators, as well as to control the speeds and positions of various motors, etc. CNC units have been designed with one or more processors that have been controlled by executive software dedicated to the required physical machine functions.

While this technique has proven satisfactory, it lacks flexibility, because the specific hardware of a machine system is closely coupled with the CNC program, so that the program is not readily adaptable for use on machines of different physical characteristics, and a change in the physical characteristic of a machine requires program modifications which may be extensive. Such program modifications may result in unanticipated side effects, as a result of the program complexity, and, therefore, program modification typically requires an extensive period of testing to be sure that no unwanted side effects or "bugs" are produced as a result of the modifications.

It is therefore desirable to provide a control system by which machine operations may be programmed in a way which is readily adaptable, to allow using an easily modified and intuitive program on different machines, and which can readily accommodate changes in the physical characteristics of machines with which the programs are used.

SUMMARY OF THE INVENTION

It is a principal object of the invention to provide a control system which is more flexible and adaptable in relation to the physical machine components with which it may be used.

The system of the present invention departs from the dedicated function approach by allowing control of the physical machinery from a general purpose computing hardware unit, such as a personal computer. Such computing hardware has a commercially available operating system layered upon the hardware, for controlling the housekeeping functions of the personal computer, and for controlling the normal peripherals associated with such computing hardware, so that they need not be directly manipulated by an application program.

By means of the present invention, control of the physical machinery is performed by a state language program that is run by executive software layered above the operating system. The state language program may be used to execute an NC (numerical control) program, which functions as yet another layer on top of the state language layer. Thus, a multi-layer system is constructed, in which each layer operates relatively autonomously, but in harmony with the other layers. By use of such an arrangement, an extremely flexible and adaptable control system is developed.

In furtherance of the layering organization, additional computer hardware is provided in the form of modules which are controlled directly from the state language. In one arrangement these modules are referred to as microPAC modules, which function as simple passive slaves that can read physical machine switches and drive solenoids, receivers, etc. for input/output functions. Alternatively, the microPAC modules can be active slaves, running in accordance with their own state language program, so that dedicated functions can be performed at high speed without intervention of any other layer of the control system. The logical layering of the state language for controlling the microPAC modules is superimposed on the state language program that runs on the personal computer, and operation of the microPAC modules is implemented by routing messages down from the state language control program through the operating system, employing the computer hardware, over a multi-drop master/slave serial connection through the microPAC modules. The microPAC modules are provided with apparatus for interpreting the state language programs, using state language control firmware.

The state language uses a text format to model a state machine. The state language control has the ability to interpret and run the state language.

The state language control of the present invention has the ability to run up to 5,000 state machines concurrently, each state machine controlling a segment of a physical machine operation. A state machine is sometimes referred to as a sequence hereinafter.

The state language incorporated in the present invention is a multi-threaded language, as opposed to conventional languages which are procedural or single threaded. The state language of the present invention has the capability of allowing direct control of servo motor position and velocity, and allows assignment of a priority to various machine states, which makes it possible for one state machine to suspend others, when desired, to convert the program from a multi-threaded program to a single-threaded program when necessary.

The state language of the present invention also has the ability to change the interface dynamically, by employing templates which define the characteristics of the interface. By this means, pictures and representations can be displayed and animated on a CRT display screen. Sizes, locations and functions of the components illustrated on the screen can be modified. Such components are, for example, text boxes for displaying text or for receiving keyboard input, screen buttons that can be activated by keyboard or by mouse input, indicators representing the states of variables, or arbitrary pictures.

The state language of the present invention also has the ability to interpret NC programs, so that Boolean parameters (having only on/off states) can be set or reset upon the reading of input information, variables can be adjusted, and complex operations can be performed by using macro operations.

These and other objects and advantages of the present invention will become manifest by inspection of the following description and accompanying drawings.

BRIEF DESCRIPTION OF THE DRAWINGS

Reference will now be made to the accompany drawings in which:

FIG. 1 is functional block diagram of a system incorporating an illustrative embodiment of the present invention;

FIG. 2 is a functional block diagram of a microPAC module incorporating an autonomous processor, employed in the system of FIG. 1;

FIG. 3 is a functional block diagram illustrating components of each "state machine" of a multi-threaded process having plural sequences and a separate "state machine" for each such sequence;

FIG. 4a is a flowchart illustrating a routine performed by the microPAC apparatus illustrated in FIGS. 1 and 2, for indexing sequences;

FIG. 4b is a flowchart illustrating a routine performed by the microprocessor of the personal computer of FIG. 1 for indexing sequences;

FIG. 4c is a memory map illustrating a state language program with a plurality of sequences;

FIG. 5 is a flowchart illustrating a routine performed by the apparatus of FIGS. 1 and 2 for decoding state descriptors and executing operations in accordance therewith;

FIG. 6 is a flowchart illustrating a routine performed by the apparatus of FIGS. 1 and 2 for executing a test or compare operation;

FIGS. 8 and 9 comprise a listing of an example 4-sequence CNC program, described in state language for execution by the apparatus of FIGS. 1 and 2;

FIGS. 10a–10i represent successive sequence scans in running the example program of FIGS. 8–9;

FIG. 11 is a flowchart illustrating a routine for representing an animated display corresponding to the real time operation of the machine of FIG. 1.

DESCRIPTION OF THE PREFERRED EMBODIMENT

Figure 7:
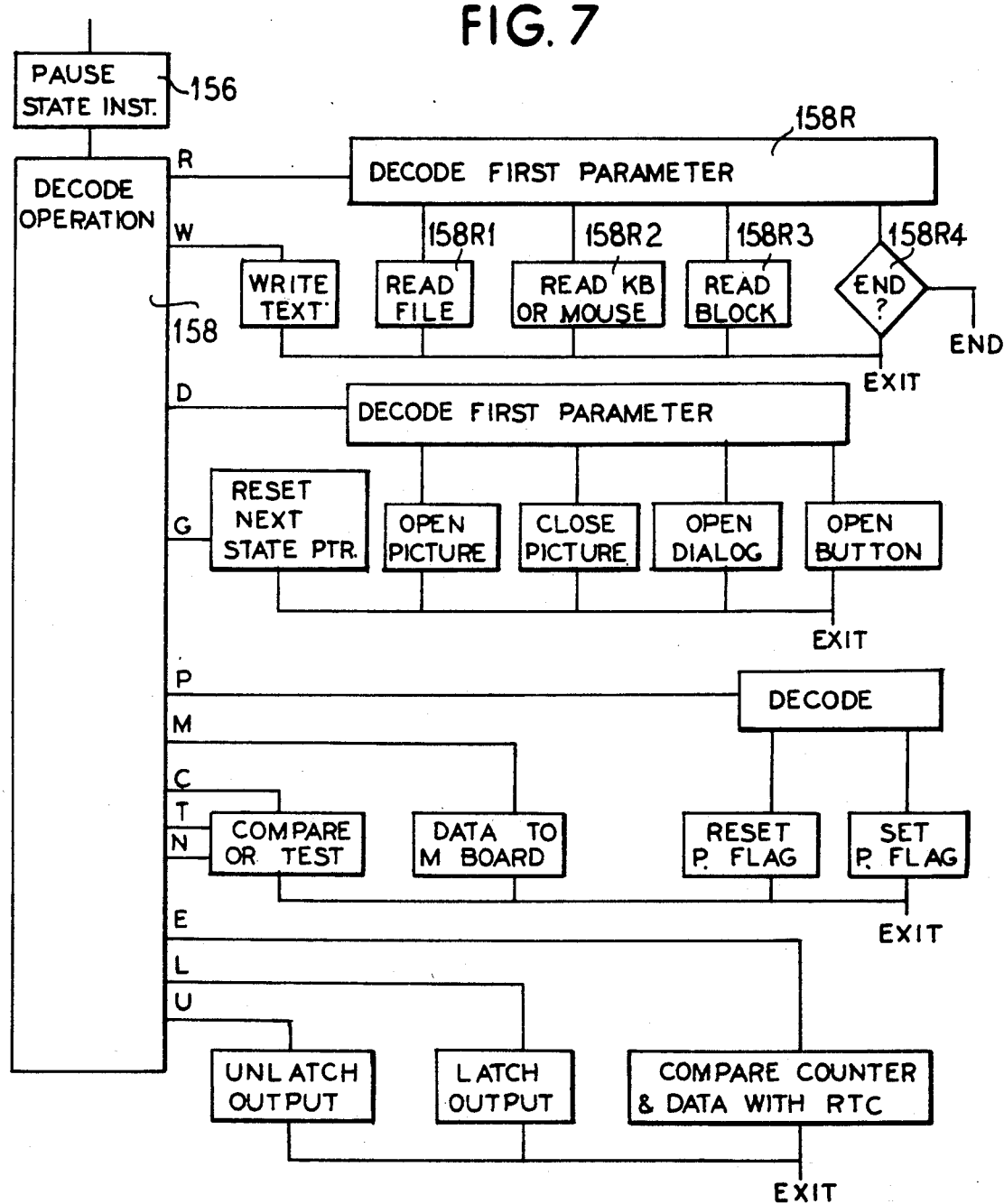
FIG. 7 is a flowchart illustrating a routine performed by the apparatus of FIGS. 1 and 2 for executing an operation.

Referring now to FIG. 1, a system incorporating the present invention to control a machine tool 10, such as an programmable punching machine, or the like, incorporates a personal computer 12, and microPAC units 14 and 16. The personal computer 12 includes a microprocessing unit or MPU 18, connected to a memory unit 20, which incorporates the standard ROM and RAM units normally associated with an MPU. The MPU 18 is also connected with a disk drive 22, for non-volatile storage. A keyboard 24 and mouse 25 supply input to the MPU 18, and a monitor 26 displays output from the MPU 18. Typically, the components of the personal computer 12 are interconnected by one or more busses, which are omitted from the illustration of FIG. 1 in the interest of simplicity.

The personal computer 12 also has an I/O unit 28, by which communication is possible with the microPAC units 14 and 16, as well as with the machine 10 directly, via the motion board 27, described hereinafter. The microPAC unit 14 has an individual RAM memory unit 30, and the microPAC unit 14 is programmable by operation of the personal computer 12, by downloading a program for controlling operation of the microPAC unit 14 directly into its memory 30. A plurality of I/O modules 32 and 34 are connected with the microPAC unit 14, and serve as an interface between the microPAC unit 14 and the machine 10.

The microPAC unit 16 is connected directly to the I/O unit 28 of the personal computer 28, and it is supplied with a memory unit 35 and individual I/O units 36 and 38 by which it communicates directly with the machine 10.

The microPAC unit 16 is a passive microPAC unit in that it always performs on command from the personal computer 12. This allows it to operate without having a program downloaded from the personal computer 12, but limits its adaptability, since its operation is not changeable.

The programmable microPAC unit 14, on the other hand, runs from a program which is downloaded from the personal computer 12, and the operation and functions performed by the active PAC unit 14 may readily be modified at any time by downloading a new program from the personal computer 12 at any time.

A motion board 27 is provided in the personal computer 12, interfacing with the MPU 18 of the computer in the conventional way using the system bus. The motion board 27 communicates with one or more servo units 9, which function to control motors or other members of the machine 10, such as the motor 7. Communication is carried on in both directions between the motion board and the MPU 18, and the servo 9, so that status and feedback signals can be tested, as well as outputs energized. Motion boards are readily available commercially, for various models of personal computers, so the board 27 need not be described in detail.

The MPU 18 of the personal computer 12 runs a program which is stored in its main memory 20 and such program is normally referred to as a "application program". In the case of the present invention, however, a state language control program 40 and a state language program 41 are interposed between the operating system of the personal computer 12 and an NC program 22. As will become clear from the following description, the interposition of the state language layers 40 and 41 between the operating system stored in the memory 20, and the NC program 42, achieves a great reduction in the complexity needed to perform the instructions of the NC program, and also an increase in the flexibility of operations of a system incorporating the present invention.

Referring now to FIG. 2, a functional block diagram of the active microPAC unit 14 is illustrated. The active microPAC unit has its own microprocessor 40, and a serial I/O unit 42 interconnects the MPU 40 to the I/O unit 28 of the PC unit 12. The microPAC unit 14 has its own memory 30, and during an initial stage of operation, the microPAC unit 14 reads a program which is downloaded from the PC unit 12 through the serial I/O unit 42 and stores the same in its own memory unit 30. Then it passes control to the first instruction in the first downloaded sequence, so that further operations of the MPU 40 are controlled by the downloaded program stored in the memory 30.

The active microPAC unit 14 has a programmable input/output interface adapter 44, which cooperates with the MPU 40 and the memory 30 in order to define a plurality of input and output lines, which are connected directly with the machine 10. These lines are connected via I/O modules 51–56 in the form of either inputs or outputs, under the control of the PIO (programmable input/output) unit 44. The PIO unit 44 has three ports, PA, PB and PC, each of which accommodate eight bits which may be individually programmed as either inputs or outputs. The I/O modules 51-56, which are interconnected between these ports and the machine 10, function to perform machine functions such as energizing solenoids, and the like, in response to output signals on individual lines of the several busses PA-PC, and provide signals to the machine 10 with an appropriate voltage level and source impedance which is required for the machine's operation. Signals produced by the machine 10, or feedback components thereof, such as limit switches, tachometers, etc., are converted by one of the I/O modules 51-56 into a signal at the appropriate voltage level to be supplied as an input on one of the lines at one of the ports PA-PC. Each of the ports can accommodate two separate modules, and each of the modules can accommodate four I/O lines. Typically, three of the modules are inputs and three are outputs, but any combination may be established, totalling six modules, for the arrangement in FIG. 2. Both analog and digital inputs and outputs can be accommodated. The PIO is a commercially available integrated circuit chip, and the I/O modules are also commercially available, and so their details need not be described.

In executing the state language referred to above, the MPU 18 must service plural sequences of instructions simultaneously, to operate as a multi-threaded machine, even though the operating system of the personal computer is adapted to only single threaded use. This is made possible by providing, for each separate sequence, certain apparatus that is reserved for the use of that sequence only. The apparatus reserved for each sequence is shown in FIG. 3. The MPU 18 executes individual instructions which are contained within state descriptors, each state descriptor comprising a line of text incorporating one or more instructions. Each state defines a single or compound operation and a time. The operation portion of the state specifies the function or functions which are to be performed, and the time specifies the time duration of the function(s), or the end condition. Such time can be a definite time interval, or an indefinite time interval, concluded with a terminating event, such as the closing of a limit switch or the like.

In FIG. 3, the instruction register 62 is common to the MPU 18, but the other components are for an individual sequence. Registers 64 and 66 are provided for all operands, respectively, a Boolean control register 68, a pseudo program counter 70, a register pair 72, an elapsed timer 74, and an I/O map pointer 76.

These units cooperate when a given sequence is selected, as described hereinafter, when the state descriptor routed to by the pseudo program counter 70 is loaded into the instruction register, so that the instructions in the state descriptor can be decoded. When decoded, the operands if any in each instruction are loaded into the operand registers 64 and 66, for access during execution of the instruction. The Boolean control unit 68 reflects the result of operations which produce a Boolean output, and instructions located at the beginning of a state descriptor can affect which, if any, following instructions are executed. The register pair 72 are used by any input/output operations, so that one or more bytes can be sent to or received from, either the microPAC modules 14 and 16, or the motion board 27. The elapsed timer 74 is set equal to the real time clock of the personal computer 12, by an appropriate En instruction, described hereinafter, and subsequently a comparison is made between the value of the real time clock and the sum of the contents of the timer 74 and the n parameter embodied in the instruction. The I/O map pointer 76 functions as a pointer to a common memory, which stores the I/O map, which represents state of every input and output line, as well as other parameters, such as flags and the like. Adjustment of the map pointer value, by data contained within an instruction, can accommodate the use of a relatively narrow bus width (e.g. the register pair 72) with a large memory area, merely by indexed addressing of the memory, using the I/O map pointer as an index to be added to a base memory address for the sequence. The I/O map pointer register can also allow reference to areas of memory which are reserved to the use of a single sequence, if desired.

Although the above description of the multi-threaded state language control has been in terms of the MPU 18 of the personal computer 12, the microPAC units 14 and 16 are also able to operate with the multi-threaded state language, by reserving portions of RAM memory for the use of each individual sequence, as described above. Using multiple sequence programming for the microPAC modules, allows efficient control of time-oriented functions of the machine 10, without delays imposed by the need to communicate with the personal computer 12.

FIG. 4c shows an example of a memory map containing a state language program in accordance with the present invention, such as may be downloaded to the unit 14. The memory map contains a first area which contains a parameter identifying the number of sequences, followed by a "Jump Table" identifying the starting point of each sequence. Following this, the sequences are stored, one after each other, with the state descriptors of each sequence, and also including a "same" area for each sequence, so the current state of the sequence can be identified.

The flowchart of FIG. 4a shows the routine for indexing among sequences as used by the microPAC. When a program is downloaded to the active microPAC board 14, from the MPU 18, control is passed to the start of the stored program, and unit 80 of FIG. 4a receives control. This unit sets a bit in a configuration message, to indicate that the unit is in its active mode. This configuration message may be inspected by the personal computer 12 at any time, to verify that the microPAC is active, and is in condition to receive a new downloaded program. Then unit 82 sets a register to point to the sequence block to be performed, and another register is loaded with the total number of sequences, which number is downloaded from the personal computer with the program, as described hereinafter. A sequence is a thread, and a number of threads can be active simultaneously in the operation of the microPAC processor 14, as described in more detail hereinafter. Then unit 84 receives control, which starts a timer, and unit 86 clears the pseudo instruction register, as well as the operand register. Then a unit 88 inspects whether this is the first sequence, and since this is the first entry into the program, the Y branch is taken, and control passes to the unit 90. This skips over some code which, as described hereinafter, finishes up a sequence operation. The unit 90 loads the pseudo program counter with the relative starting address from the sequence block, and then the offset to the start of the active code is added, to make the pseudo program counter absolute, and a register is loaded with the elapsed timer for this state.

Then the unit 91 checks to determine if the current sequence is equal to zero (or the first sequence). If true, then the normal serial I/O routine is executed, and serial data is checked for, from the personal computer. If serial data is waiting to be received, the "semaphore" test unit 91a recognizes the condition, and unit 91b receives the data from the personal computer 12, which may be, for example, a new program, or an update of the output lines which are to be set or reset, or an output of the input lines from the machine 10 which are to be inspected by the microPAC unit. When a reply is required, in response to a message from the personal computer 12, the unit 91b composes such reply and forwards it to the personal computer. Conventional techinques are used for serial communication between the personal computer 12 and the microPAC, and so these operations need not be described in detail.

Following communication, if any, with the personal computer, units 92-95 respectively read inputs required to be supplied to the machine 10, and supply them to the machine, read outputs from the machine 10, reset a "watchdog" timer, and then gets and executes the next instruction to be performed. The watchdog timer normally does not time out, but is provided as a safety means of resynchronizing the operation, in case of some unexpected fault. If the timer times out, it means that the program is not operating normally, and may be "hung up" in an endless loop. The timeout of the watchdog timer causes an interrupt which resets the enviornment of the program, and restarts the program from a known condition, so that normal operations can be resumed with minimum interruption. The techniques for controlling and using watchdog timers are well known, and thus will not be describe further.

When the current state is completed, by the unit 95, control returns to the unit 88, and the pseudo instruction counter, and the other components of FIG. 3 are saved, and control passes to unit 97. If the last instruction was a "Go", signifying the end of a state, the elapsed timer is reset by unit 97a, and then the timer is saved. A check for priority is made by unit 99. If true, the sequence counter is not incremented and the current state of the sequence remains the same. Then a control returns to unit 90, and the loop is repeated.

In this manner, a number of sequences are executed by the program simultaneously in the following manner. The current state instruction of the first sequence is executed, and if there is no priority instruction, execution passes directly to the current state of the second sequence. This occurs for all of the sequences, up to approximately 5,000, after which operation returns to the current state of the first sequence. On returning to this state of the first sequence, if the timer instruction is active, the program inspects to determine whether the time associated with that state has expired. If not, control passes immediately to the current state of the second sequence, and so on. If it is determined, on inspection, that the time has expired, then the pseudo instruction counter is incremented to point to the next instruction in the current state. Thus, each sequence has its current state inspected in turn, and during each inspection, if it is found that the timer instruction is active and the time interval associated with such state has expired, control passes to the next instruction in the same state, before continuing on to the current state in the next sequence.

This program flow is interrupted in the event of a priority command, which is used for time critical operations. When a priority command exists, after interrogating the state and finding a priority command, control passes to sequential states in the same sequence repeatedly, until a priority halt instruction occurs. Then control passes to the next sequence. In this manner, a priority state gives absolute priority to a sequence, so that a single sequence receives the undivided attention of the system resources.

The organization of the plural sequence of state instructions facilitates control of machine operations which are relatively long in duration. For example, if a state instruction requires a movement until a certain distance has been covered, or until a limit switch has been actuated, or until the expiration of a minimum time interval, the performance of the state can take a relatively long time in the order of seconds, for example. During this time interval, in conventional systems, the processor is merely waiting for the termination of the state, without doing anything useful. However, in the present invention, the processor services all of the active sequences, and, in the event that every sequence has a continuing state in a non-priority mode, the processor continually cycles among the sequences, so that the operations can progress without any unnecessary delay.

Within a given state, the apparatus of FIG. 3 is employed to process each of the pseudo instructions. The instruction which is executed is the one to which the pseudo program counter is pointing to, and the first step in the instructions is to load that instructions into a register. Next, the instruction is checked to see if it is a colon. If so, then the Boolean register is reset to true, and the next instruction is pointed to and the process repeated. If the instruction is an "end of line", then the pseudo program counter is adjusted to point back to the beginning of the current state, and program control is passed to the sequence processor. This is because an end of state is identified by a "Go" instruction or "end of line", and in either case the current state is left in order to execute the current state of the next sequence.

If the pseudo instruction is not either a colon or the "end of line", then the Boolean control unit 68 is checked. If it is true, then processing continues, and the instruction is decoded. If the Boolean control is not true, then the current instruction is not executed, but is skipped so that the next instruction following the current instruction is executed. This allows processing to continue in a manner in which alternative instructions are performed, in dependence on the state of the Boolean control unit.

The passive microPAC unit 16 can operate in the same manner as described above in connection with the active microPAC unit 14, except all inputs and outputs are controlled directly by control signals from the state language program run by personal computer unit 12.

The state language which has been described above is employed in the microPAC microprocessor 14 as well as in the MPU 18 of the personal computer 12. In both MPU's multiple threads can be accommodated, with immediate conversion to a single threaded operation upon the recognition of a priority command. However, the state language used by the personal computer 12 is a super set of the language used by the microPAC units, with additional instructions for interfacing with the personal computer 12 and its peripherals.

It will be appreciated that the state language is capable of performing all functions associated with the machine 10, by controlling the various I/O modules, and that control can be performed at any time by suitable instructions issued from the personal computer 12 to the active microPAC processor 14 or the passive processor 16. In addition to the sequence which is active in each case, is a serial communications program which carries on the communication process between the personal computer 12 and the microPAC units 14 and 16.

The state language achieves great simplicity, in that it is readily adaptable to the physical characteristics of the machine 10. It is only necessary for it to operate the I/O modules 51–56, for example, and allow processing from state to state within the various sequences, as a result of completion of successive states in each sequence. This simplicity of organization also makes it easy to use the state language to execute various machine functions in order to execute NC programs, for example, by interpreting conventional NC programs such as may be run on a conventional machine. In this case, an NC program is run, which causes the machine 10 to undergo a series of operations which results in the production of a manufactured product or the like. These operations involve movements of a table supporting a workpiece, and movements of cutting or punching members, in precise sequences, and in precise locations relative to the workpiece. When such an NC program is run with the system of FIG. 1, the state language program is able to interpret the NC program, and activate a series of state sequences, which are performed in the manner described above.

From the foregoing it will be appreciated that the present invention offers a reliable and flexible means by which a variety of different machines may be readily operated to execute a given NC program, which may have been originally written for execution on an entirely different machine. The flexibility of the state language program which allows the translation of the NC program into machine states, allows a single NC program to be run on a number of different machines, simply by making minor modifications in the state language program.

Referring now to FIG. 4b, the routine for the microprocessor 18 of the personal computer 12, for indexing among the several sequences and identifying the current state of each sequence, is illustrated. The first unit to receive control is unit number 100, which gets the sequence identifying number. Each of the several sequences which is being performed at a given time has a number, and the highest sequence number is stored in a memory location identifying the maximum sequence number. The first sequence (number 1) is identified by the unit 100 the first time it is accessed. Then control passes to unit 102, which points to the current state in the sequence identified by unit 100. Then unit 104 decodes the state and executes the operation or operations specified in the instructions for that state. Then unit 106 determines whether the priority flag is set, and if so, control is returned to unit 102, so that the current state of the same sequence is executed. Normally, an operation executed by means of unit 104 will set the pointer to the next current state, so that when control returns from unit 106 to 102, it is the next state in the current sequence which is given control. However, when the operation executed by means of unit 104 does not identify the next following state, then the same current state is identified, and unit 104 decodes and re-executes the same state. This allows a given state of a sequence to retain control until the expiration of a time interval specified for the operation of the state.

As described in more detail herein, one of the operations which may be executed by the unit 104 is a resetting of the priority flag, in which case unit 106 passes control to the unit 108. The unit 108 selects the next sequence number and passes control to unit 110, which determines whether the maximum sequence has been exceeded. If so, unit 112 resets the sequence number to the first sequence, so that all sequences are performed in order, with a different sequence being performed during each loop of the routine shown in FIG. 4a. Then control returns to unit 100, to form a repeating loop.

The unit 114 receives control, from the unit 112, once during scan of the sequences, and gets data from the microPAC board, consisting of an input I/O bit map, with a bit position for every output line of the machine 10 which is being monitored. The bits are set for lines which are high, for example, and otherwise are reset. Then unit 115 sends an output bit map to the microPAC unit, which has its bits set for the control lines of the machine 10 which are to be activated. Then unit 116 updates the display of the monitor screen, by making an off-screen bit map, which may have been modified by the instructions during the scan of the sequences, the active map, so that its contents are displayed by the monitor.

FIG. 5 illustrates a routine by which the state instructions are decoded and executed. It corresponds to unit 104 of FIG. 4b. When it receives control, unit 118 inspects whether the next character in the state description is a colon, and if so, it resets the Boolean control flag to false by means of unit 120. Next, unit 122 receives control and determines whether the instruction is a test or compare. If so, unit 124 performs the test or compare, and unit 126 sets or resets the Boolean control flag in response to the test outcome. Then unit 128 inspects whether the end of the line has been reached in the state descriptor. If so, unit 130 resets the elapsed counter by setting the counter to the current state of the real time clock, and passes control to the exit, without adjusting the state pointer. Thus, when a state descriptor does not end with a Go instruction, the state pointer remains pointing to the same state, so that it can be re-executed the next time its sequence is accessed. If unit 128 does not recognize the end of a line, control passes to unit 134, which determines whether a Go instruction is present. If so, the counter is reset by unit 136 by setting it to be equal to the real time clock, and unit 138 adjusts a pointer which adjusts to the next state in the sequence. Then control passes to the exit.

If a Go instruction is not recognized, control passes to unit 136, which inspects the state of the Boolean flag. If it is true, unit 138 executes the instruction in the state descriptor, after which unit 114 advances a pointer to the next instruction in the current state, or to the end of the line if there are no more instructions. Then control returns to unit 118 which inspects whether there is a colon following the instruction executed by means of unit 138. If the Boolean flag is false, then unit 140 receives control, which skips the following part of the descriptor, up to the next colon or to the end of the descriptor.

In a state descriptor, a number of instructions can occur consecutively, and if these instructions are test or compare instructions, all of the instructions are performed and the Boolean flag is set or reset by the unit 126 for each test or compare. If any of the tests cause the Boolean indicator to be false, then the remainder of the instructions are skipped up to the next colon by unit 140. Otherwise, the following operation is executed by the unit 138. Thus, the stringing of a number of tests instructions consecutively on the line of a state descriptor performs an AND function, whereby all of the tests must be true before the subsequent operation can be performed. Otherwise it is skipped. When an instruction is not preceded by a test or compare, it is performed, unconditionally, so that a number of operations can be performed in a single state, simply by putting appropriate instructions on the same line of the state descriptor.

One or more colons can be placed in the line of a state descriptor, to designate the position in the line which is next to be recognized, after the Boolean test of the unit 136 proves false. In this way, a logical OR function can be represented by a number of colons separating the state descriptor line into a number of regions, each region incorporating a test instruction, followed by an operation instruction, and then followed by a G instruction. If the test is true, the operation is performed, and the rest of the line is skipped. Otherwise, if the test is false, the instruction is skipped up to the next colon, so the next test is performed, which if true, a designated operation is performed. If this his instruction is followed by another Go instruction, the rest of the line is skipped. It is thus apparent that logical operators are inherently executed by the state language, even though they are not designated explicitly.

FIG. 6 illustrates the routine which performs a test or compare, and sets the Boolean flag accordingly, represented by units 124 and 126 of FIG. 5. Control passes to unit 142, which determines whether it is a compare operation. If not, a Boolean test for a binary 1 or 0 (T or N, respectively), is implied. In this event, unit 144 receives control, which passes a state instruction and determines what variable to test. Unit 146 then gets the bit to test, which is a designated bit of the I/O bit map corresponding either to an output bit map sent to a microPAC unit or an input bit map received from a microPAC unit, and unit 148 determines whether it is true or false, set or reset, etc. If the instruction is "N", which tests for a "not"60 condition, the bit is inverted by unit 146. If true or set, the Boolean flag is set by unit 150 and otherwise it is reset by the unit 152. Then control passes to the exit.

If the unit 142 determines that a compare operation is specified, then unit 146 parses the state instruction, and units 148 and 149 get the values to be compared, and pass them to a compare unit 150. If the compare instruction requires evaluation of one or both of the values, by referring to them by an expression, the expression is evaluated by the unit 148 or 149 or both. The comparator unit receives the other value to compare from a unit 146, along with the mode of comparison. The mode may be equal, greater than, equal or greater than, etc. The result of comparator unit 150 either sets the Boolean flag by means of unit 152, or resets it by means of unit 154, after which control passes to the exit.

Referring to FIG. 7, the routine for executing the current operation instruction is illustrated, corresponding to unit 139 of FIG. 6. When this routine receives control, the unit 156 parses the instruction of the state descriptor, and passes control to unit 158, which decodes the required operation. The unit 158 produces outputs in accordance with the instruction which is decoded, as symbolically represent in FIG. 7. For example, the R (read) instruction has several sub-instructions, and they are decoded by unit 158R, from the first parameter of the read instruction. Then one of several units 158R1-158R4 are given control, to read in an NC file, read data input from the keyboard or mouse, read in a block of a designated file, and detect an end of program descriptor. Recognition of other commands are treated similarly, with control passed to exit in each case, after the operation is executed.

FIGS. 8 and 9 illustrate four sequences, which form a sample state language program to illustrate the operation of the present invention. The state language program loads an NC program from external memory, such as the disk drive 22, and reads in and executes the first two blocks thereof. The particular NC program of the example moves the punch (relative to the work) by a distance along the x axis and operates the punch and then repeats. Sequence number 1 is shown in FIG. 8, which comprises state language code for initializing a sequence, or a "state machine". State 1.1 reads a template, which establishes the screen display and designates areas thereof for dialog boxes (for text display or input from the keyboard or mouse), and screen buttons (soft keys) which can be operated by either keyboard key or mouse. Appropriate initialization signals are sent via M instructions. The motion control board controls operation of the servos, for specific machine movement functions. The priority function is on during this period, beginning with state 1.10.

Then an NC program is selected by entry of the NC program name via the keyboard, in state 1.220 and the NC program is displayed on the screen (state 1.270) as well as the current machine x axis position (state 1.260).

FIG. 9 illustrates three additional sequences, which are executed contemporaneously with sequence 1. Sequence number 2 is the automatic cycle "state machine", in which five I/O channels are defined, and a cyclically operational loop is initiated. A move along the x axis is set up, and the position is displayed, and the punch is started. At the end of the block, the next block of the NC program is read in.

Sequence number 3 is the cycle stop operation. This sequence latches a cycle stop Boolean at any time by depression of a control which is specifically a soft key identified as number 507. A soft key is a designation of a key which appears on the display screen. The soft key is "operated" by depressing a designated key of the keyboard associated with the soft key, or using a mouse to place the cursor on the soft key and then operating the mouse normally, by clicking on the soft key.

Sequence number 4 is a sequence which displays a punch picture, demonstrating that the punch is operating, for a period of one second, and then turns the punch off.

In the program illustrated in FIGS. 8-10, the state descriptors illustrate a number of instructions of the state language program, and the several instructions have one or more parameters associated with them. The following is a summary of the instructions which are used with their syntax.

R[T,filename]

This instruction opens a template corresponding to a particular template file name. The text which is displayed at any given location on the screen of the monitor, are contained in a string variable, identified by "$n", where n is the identification number of a string variable. Each variable is mapped to a specific part of the screen by the template. The template also establishes locations for soft keys, screen buttons, and pictures.

R[N,filename]

This instruction reads, from the keyboard, the name of a file corresponding to an NC program to be executed and loads the program into memory.

R[B,1,F]

This instruction advances the block pointer to the next block of a loaded NC program, in response to the parameter "1". The parameter "F" (false) signifies that the block is not to be decoded.

R[B,O,T]

This instruction responds to the "T" parameter to decode the block which is currently pointed to. The "0" parameter signifies that the pointer is not to be advanced to the next block.

Gn

This instruction resets the pointer of the current state, so that a "Go"60 to the pointer location is performed.

W[n,"text"]

This instruction writes to the screen, at location n, a message in the form of "text". The position on the screen, where the text appears, can be designated by additional parameters, or by default from the current template. Text can also be a list of variable special characters, etc., separated by commas.

D[D,O,n]

This instruction opens a dialogue box designated by the identifier n. The dialogue box is mapped to the screen by means of the screen template which has been opened.

D[P,O,n]

This instruction opens a picture, identified by the number n, which is displayed at a position on the display which is mapped by the open template.

D[P,C,n]

This instruction closes the picture identified by the number n. The picture is erased from the display, and is replaced with either background, or existing material which occupied that area of the screen before the picture was opened.

P[S]

This command starts the priority mode, which maintains operation in a single sequence.

P[H]

This instruction halts the priority mode and allows resumption of scanning among sequences.

M[Command,axis,data]

This instruction causes a movement of data from the MPU to a motion board 27 of FIG. 1, which sends and receives data to and from a servo 9 associated with a motor 7 of the machine 10. One or more of such servos are connected directly to each such motion board. Such boards are readily available, and respond to a large number of commands, supplied over the internal bus of the personal computer 12, in order to control the operation of servos, for modifying position and velocity, etc., of various movable members of the machine 10. In addition, switches can be closed, solenoids can be actuated, etc. The particular function which is performed is determined by the "command" parameter sent to the motion board. The operation data field contains data associated with a command, such as the distance of the next traverse to be effected, etc. The "axis" parameter identifies the servo unit which is being controlled.

F[Expression]

This instruction forces a designated variable to assume the value corresponding to an expression. For example, in state 1.40 of FIG. 8, the variable VG13 is forced to assume the sum of several constants.

C[Expression]

This instruction causes a comparison of values identified in the expression. For example, C [VG1==0] compares the value of the parameter VG1 with zero. The Boolean flag is set in response to the comparison.

En

This instruction compares the time, determined from the personal computer's real time clock, with a value stored in a counter incremented by the interval n. If the real time clock has not yet reached that sum, a false result is returned. Otherwise, the result is true. There is one such counter for each state, which is referred to as the elapsed time counter. The interval n may refer to increments of 1000th of a second, or increments of 10th of a second.

Tn

This instruction tests the value of a particular bit of the I/O map, and returns true if it is set, and false if it is not set.

Nn

This instruction is like the test instruction Tn but returns true for a reset bit and false for a bit which is set.

Ln

This instruction latches on an output identified by the number n, so that it remains active, until unlatched. The latched output is represented by setting the bit corresponding to the designated output in the I/O map. When the I/O map is sent to the microPAC unit 14, for example, a designated output of the units 51-56 is latched on.

Un

This instruction unlatches a latched output, and resets the bit in the I/O map, after which the designated output from the I/O modules 51-56 is reset.

Figure 12:
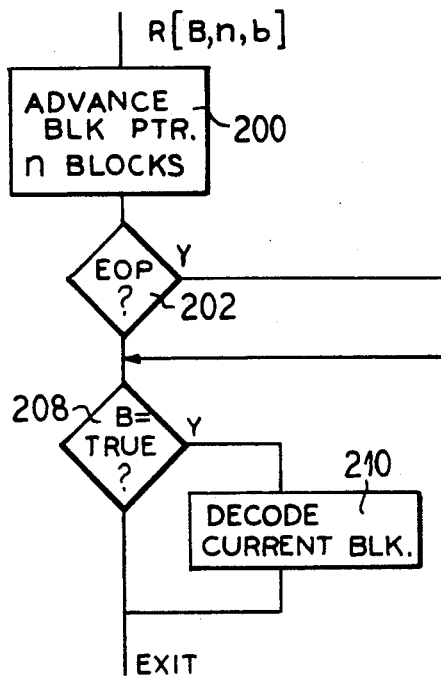
FIGS. 12–14 are flowcharts illustrating the read block command of the state language employed in the present invention.
Figure 14:
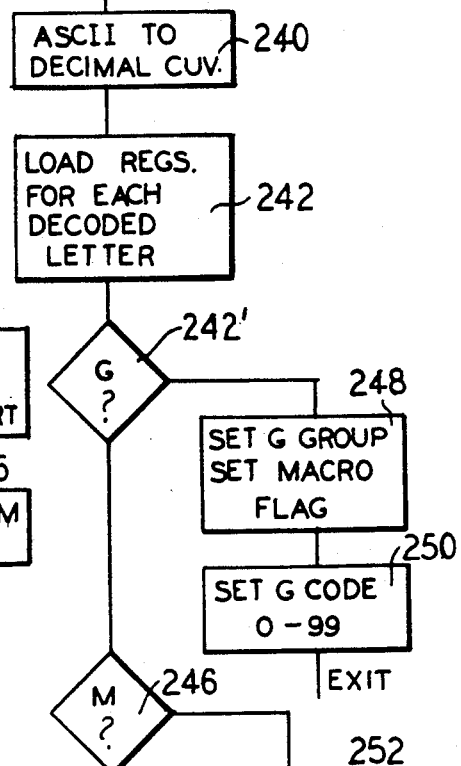
Figure 13:
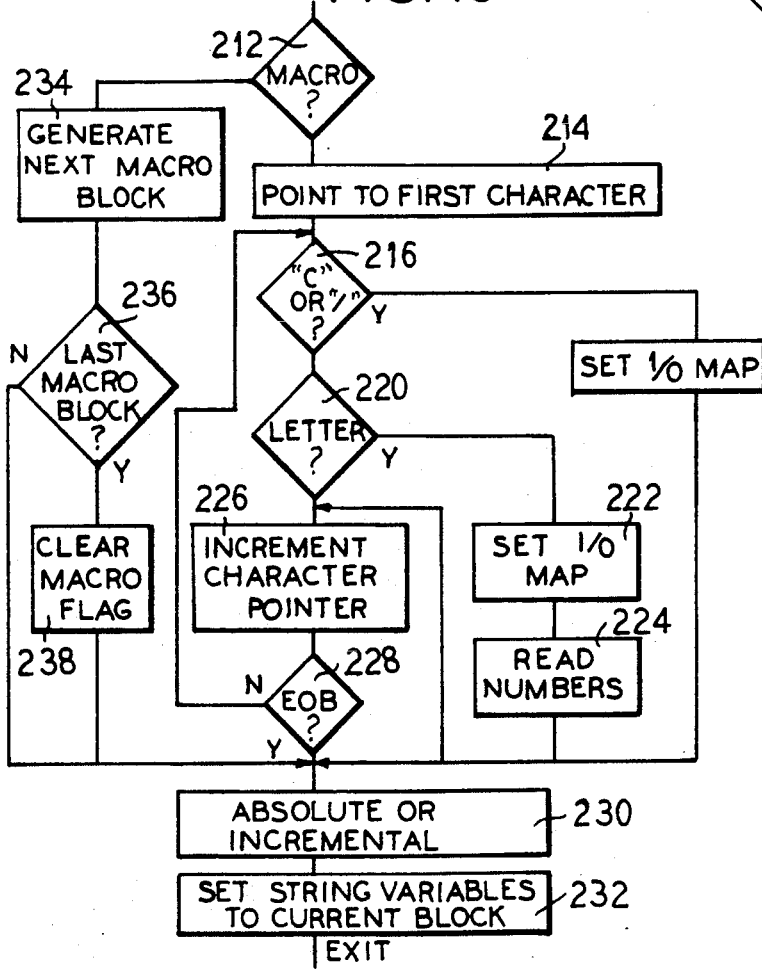

Referring now to FIGS. 12-14, a series of flowcharts are presented for explaining the operation of the read block command R[B,n,b]. This command is effective to interpret the blocks of a conventional NC program, and convert the same into a series of set bits in the I/O map, and, when necessary, to generate a number of blocks which are supplied to the state language program, in response to the reading of certain blocks of the NC program. When the read block command is recognized, unit 200 receives control, which advances the block pointer n blocks, corresponding to the parameter n in the command. Unit 202 then inspects to see whether the end of the program has been reached, and if so, unit 204 resets the block pointer to the program start, and unit 206 sets the program end flag. If not, the unit 208 receives control, which determines whether the b parameter of the instruction is true or false. If true, the current block is decoded by unit 210, after which the program exits.

The routine within the unit 210 is illustrated in FIG. 13. Unit 212 first receives control, which tests to determine whether the macro flag has been set. It is not set the first time the unit 212 is reached, and so control proceeds to the unit 214, which points to the first character within the current block of the NC program. Then unit 216 inspects for special symbols, and if found, the I/O map is set accordingly by the unit 218. Otherwise, unit 220 determines whether a letter, such as "x" is present, and if so, an appropriate bit of the I/O map is set by unit 222. If a numerical parameter follows the letter, it is read by the unit 224, which receives control from the unit 222. Then unit 226 increments the character pointer. In the event a letter is not recognized by unit 220, the unit 226 receives control directly. Then unit 228 tests for the end of block, and if it is not reached, control returns to the unit 216, which repeats the process described above. At the end of the block, unit 230 determines the mode of control (whether absolute or incremental) and then unit 232 sets string variables equal to the values contained in the current NC block. Then the program exits, which allows execution of the instructions of the state descriptor which corresponds to the settings of the I/O map, as well as the string variable set by the unit 232, etc.

As described hereinafter, the unit 224 may determine that a macro is necessary, and set a macro flag. When this occurs, the next time the unit 212 is entered, control passes to unit 234 which generates the next block required for the particular macro. For example, if the letter and numbers recognized by units 220-224 correspond to "G28", this is recognized as the NC program code for a bolt hole. The formation of a bolt hole requires multiple moves and punches of a punching machine, and the first series of state descriptors which are required are those generated by setting the I/O map and the string variables in the first pass through units 216-232. However, when the state language program such as the one shown in FIGS. 8 and 9 senses the end of a block, the read block command is again performed, and control passes through the units of FIG. 12 and again arrives at unit 212. Then unit 234 receives control, which generates the next block, setting appropriate bits to the I/O map and resetting others, and setting the string variables to the appropriate values, so that the state of the I/O map and string variables is just as if the second of a series of blocks have been read from the NC program, instead of the second block being produced artificially. Then unit 236 determines whether the last macro block has been produced, and if so, unit 238 clears the macro flag. Then control passes to the unit 230, so that the state descriptors which are implied from the bits set in the I/O map and the string variables, can be executed normally.

In this way, conventional NC programs, which are prepared for the machine 10, can be interpreted by the state language program, converted into a conventional state descriptor, and executed normally.

FIG. 14 illustrates the steps performed by unit 224 of FIG. 13. Unit 240 converts from ASCII format to decimal, and unit 242 loads registers with the numerical parameters associated with each letter, such as "G28". Then unit 244 inspects for a conventional NC "G" code, such as "G28", and if such is found, units 248 and 250 receive control to set a flag to the G group, set the macro flag, and set the appropriate codes. Units 246, 252 and 254 do the same for the conventional NC "M" codes. FIGS. 10a-10i illustrate a succession of scans, through the four sequences illustrated in FIGS. 8 and 9, and graphically depict the level of the operations performed during each state. The levels are identified in FIGS. 10a-10i by the columnar position on the page, the six different levels being respectively (personal) computer hardware, operating system, microPAC (the state language controller), PAL (the state language), microPAL (the operation of the micropPAL units 14 and 16), and NC (the NC program). PAC in this context refers to personal automation control program, which controls execution of the personal automation state language or PAL. The NC level refers to the application program, which in this instance comprises two blocks, namely block X10 and X20. The first block is selected by means of the operation of state 1.220 of sequence number 1, which is the first state of sequence number 1 following the priority interval which initializes the system. The sequence of FIG. 10a starts the initialization sequence at the NC level, by identifying the loading of the block X10. Following initialization, sequence 1 is executed down to state 1.280, where the program control waits for depression of a program key. In state 280, input number 505 must be true (corresponding to a program key), and input number 3 must be false before the next instruction can be executed, namely Go, which increments the current state to state 290. Until these conditions are met, the recognition of a Boolean false condition causes skipping the remainder of the state descriptor to the end, so that the Go instruction is not executed, and the state is not advanced.

Figure 10A:
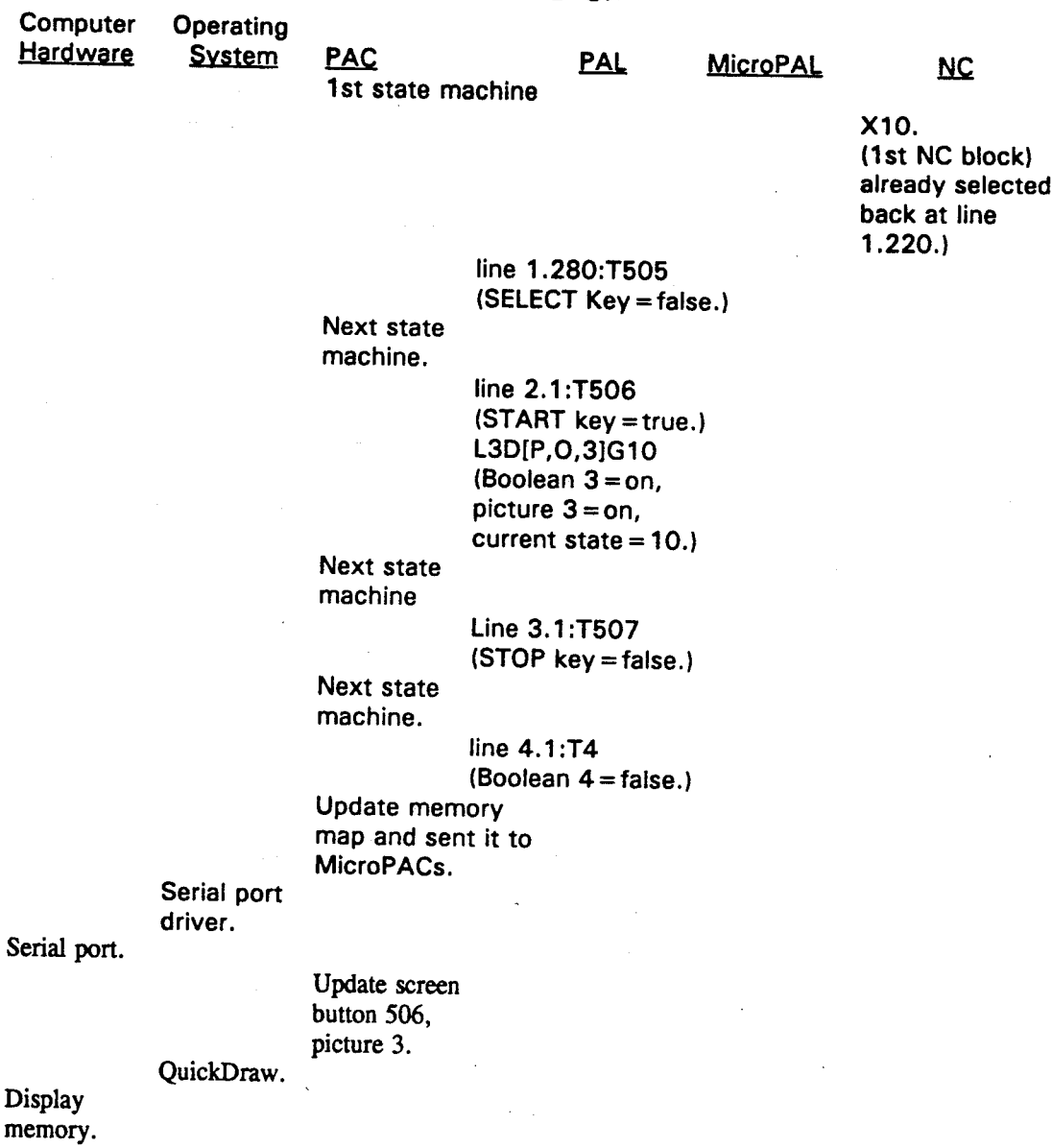

As illustrated in FIG. 10a, the select key is not operated, and so control passes to the PAC level, which selects the next sequence or state machine. Then state 2.1 of sequence number 2 tests the start key identified as parameter 506 of the I/O bit map, which is the bit at location 506 thereof, and executes a display function by opening picture number 3, and latching on output number 3. Picture 3 indicates graphically on the display screen that the cycle is on.

The state of sequence 2 is advanced to 2.10, after which the PAC level increments to the next state machine, namely sequence number 3, and returns control to the PAL level. Then, state 3.1 of sequence number 3 is executed, finds the stop key (507) false, meaning that the soft key mapped to location 507 of the I/O bit map is not set, and returns control to the PAC level. The PAC level increments the state sequence, and passes control to the PAL level, which executes state 4.1. It finds the number 4 input false (corresponding to the punch being off), and returns control to the PAC level, thus concluding a complete scan of the four sequences. Before the PAC returns control to sequence 1, it sends the updated I/O map to the PAC boards, designated in FIG. 10a as the microPAC units. The I/O map constitutes the area of memory pointed to by the map index register (FIG. 3), for each sequence, and constitutes a record of the state of every output line, and every input line, as well as bits and flags which may be set or reset during operation of the various routines. As the I/O map is changed, the serial communications process sends the updated map to the microPAC units, and a semaphore is set by unit 91a of FIG. 4a. Subsequently, the outputs of the I/O modules 51-56 are changed in accordance with the I/O bit map. Serial input from the microPAC unit to the personal computer 12 is handled in a similar fashion.

In order to accomplish serial communication, the serial port driver of the operating system is invoked, and the serial port within the hardware level of the personal computer is employed to forward the memory map to a selected microPAC unit. This causes the setting and/or resetting of any designated output lines, such as the number 3 output line which is latched in sequence number 2. In addition, the PAC level updates the screen by switching the active bit map to the off-screen bit map, which is adjusted by instructions executed in the several states of the various sequences. The new active bit map shows the button 506 in an operated mode, by highlighting it, or changing its color, or the like. In addition, picture number 3 is displayed, in accordance with state 2.1. The screen is updated by invoking a "quick draw" function incorporated in the operating system, which changes the active bit map of the display memory within the hardware level of the personal computer, in order to change the appearance of the screen.

The second scan through the sequence is illustrated in FIG. 10b. Operation passes between the PAL level and the PAC level as described above, and the PAC level selectively uses the operating system level in the computer hardware level, also as described above. In the scan illustrated in FIG. 10b, state 2.10 finds the start key false and unlatches output number 5. The current state of sequence number 2 is set to state 20.

In FIG. 10c, the next two scans are illustrated, in which operation proceeds through state 2.20, and 2.30 at which the current block of the NC program is read and decoded, and the variable VG100 is found equal to zero. As described more fully hereinafter, decoding of the block X10 of the NC program results in setting a number of bits in the I/O bit map, corresponding to the characteristics of the decoded block. In the example shown, the bits 1068 and 1317 are set and reset, respectively, and the variables VG65 and VG69 are assigned by virtue of the block which is decoded. Bit 1068 signifies that the decoded block can turn an "x" (for the x axis move) and the reset bit 1317 means the NC program has not ended. VG65 and VG69 indicate that the x distance to be moved is 10 (inches). The string parameters sent to the display screen in state 2.120 are also set by the decoded block, by virtue of the R[B,l,F]command in state 2.150. Parameter 422 in the bit map indicates whether the x axis is moving or is stationary. Command 4E (hexadecimal) commands the motion board to start the x movement and command 41 stops it.

In FIG. 10d, more scans are illustrated, in which operation proceeds through state 2.40 and 2.50, in which command number 41 is sent to the motion board, for axis number 4 (the x axis), and parameter number 422 (corresponding to position 422 of the I/O bit map) is tested for an off condition. This is found to be true, and the current state is set to 50. In state 2.50, parameter number 1068 is tested for zero condition, which is found to be false, whereby the current state is set to 60.

In FIG. 10e, state 260 is executed, which includes a priority start instruction, so that succeeding states are executed in sequence number 2, without leaving the sequence. Each time a state is executed at the PAL level, however, control returns to the PAC level, which thereafter returns control to the current state in the sequence number 2. This continues through state 20, where the priority mode is halted, after which, when control returns to the PAC level, control is then passed to sequence number 3.

In FIG. 10f, the four states are again scanned, and state 2.130 is executed, setting the current state to 140.

In FIG. 10g, state 2.140 is executed, setting the current state to 150, and state 4.1 is executed, setting the current state to 10.

In FIG. 10h, state 2.150 finds an end of program condition, whereupon the next block of the program is read. Then control passes to the NC level, which reads a second NC block, namely X20, into the memory of the personal computer. The current state of sequence number 2 is then set to 20. In state 4.10, the state of the timer is inspected, and found to be false, so that the current state is not changed.

In FIG. 10i, state 2.20 is executed, in which the second NC block (X20) is read and decoded. Meanwhile, state 4.10 still finds the timer false, and accordingly it does change the current state in sequence 4.

The sample program illustrated in FIGS. 10a-10i illustrates, in graphical fashion, the multi-level nature of the control system of the present invention, as well as its multi-threaded organization, which allows four sequences to proceed simultaneously, but makes it possible to give one sequence priority when necessary.

Although the operations performed in the sample program of FIGS. 10a-10i are relatively simple, it will be apparent that more complex machine operations can be programmed using movement along multiple machine axes, the use of multiple selected tools, and the integration of controls for loading and unloading workpieces from operating stations and the like, by adding commands to the state language when necessary. New commands are decoded and executed in the same manner described above. The state language of the present invention can be modified readily, by adding further sequences, and as many as 5,000 sequences can be accommodated, with each sequence executing one state in turn, as all the sequences are scanned, the manner illustrated in FIGS. 10a-10i.

Referring to FIG. 11, a flowchart of operations consisting of a diagnostic routine is illustrated. The routine allows the display of a schematic diagram or the like for maintenance purposes, along with a real time display of the condition of the machine, by using the state language described above.

When the routine is entered, unit 160 receives control, which opens the template and unit 162 opens a dialog box within the template, which allows selection of a particular component for review by the user. The user makes the selection by means of a keyboard or mouse, under control of unit 164, and then unit 166 opens the template for that selection, and unit 188 opens the picture associated with the template.

When, for example, the selected component is one of the I/O modules 51-56, the picture opened by unit 168 and displayed on the monitor screen is a schematic diagram of the selected module, with legends indicating the significance of its inputs and/or outputs. Then unit 170 receives control and tests the state of the inputs associated with the module, and unit 172 writes to the screen at areas designated by the template opened by unit 166, for each of the possible inputs, and shows the inputs which are active in highlighted form or in a different color condition. When unit 174 tests the outputs associated with the selected I/O module, unit 176 highlights the active outputs. Then unit 178 receives control, which allows the user to enter an instruction which may or may not effect the component under investigation, the real time operation of which is being displayed on the screen. Then unit 180 executes the instruction entered by the operator, and returns to the control unit 170, so that the inputs and outputs are updated, showing the active ones in highlighted form or in a different color condition. In this way, the operator can verify visually the proper operation of the component, and can isolate a fault when the operation is not correct.

The routine of FIG. 11 can also be employed to illustrate, on the display screen of the monitor, the real time operational characteristics of the machine 10. When, for example, the template selected by units 164 and 166 relates to the operational characteristics of the x servo drive, for example, the operation of the units 170 and 174 may send to the motion control 27, for example, a command for a specific motion, such as movement of one inch in the x direction. During the one-inch movement, the signals indicating position of the x drive are continually sensed, in repetitive fashion, and the bit map for the screen updated in a way which presents a graph with equal increments of time as the abscissa, and the position of the x drive is the ordinant. The result is a dynamic response curve, showing the position of the x drive relative to time, for the given standard movement command. This enables verification of correct operation of the x servo drive, and facilitates maintenance when such is required.

The routine of FIG. 11 can also be used to facilitate training of an operator for a particular machine, when such machine is not connected with a control system. In this event, the units 170 and 174, which tests inputs and outputs, respond to the instruction entered by the user in unit 178, to change the I/O bit map just as a given machine would during normal operation. This causes the display to be updated just as if the machine were connected, and is useful for training purposes, without the requirement that a machine be physically connected to the control system. Training is facilitated because the expense of taking a productive machine out of service for training purposes is avoided, and any damage to material or persons which might result from the mistake of a novice operator is avoided.

It will be apparent that various additions and modifications may be made in the apparatus and methods of the present invention, without departing from the central features of novelty thereof, which are intended to be defined and secured by the appended claims.

What is claimed is:

1. A multilevel state control system for an NC machine, comprising, in combination, a personal computer having an operating system for driving peripheral units of said personal computer, said peripheral units including at least a keyboard and monitor for input and output from said personal computer, an I/O unit adapted to receive data inputs and transmit data outputs over one or more data lines, said personal computer having memory means for storing a control program for controlling said peripheral units, at least one programmable personal automation control unit connected to the said I/O unit of said personal computer, and having a microprocessor unit and memory means for storing a program of operations for said microprossessor unit, and I/O means interconnecting said microprocessor unit with said one or more data lines, whereby the program of operations for said microprocessor is downloaded to said programmable personal automation control unit from said personal computer, a plurality of I/O modules connected to said personal automation control circuit and connected to said machine for supplying inputs to said machine and for deriving output signals from said machine, said control program of said personal computer being organized in a plurality of sequences, each said sequence having a plurality of successive states each described by a state descriptor, and said program of operations being made up of a plurality of state descriptors for each said sequence, each said state descriptor incorporating one or more instructions for said personal computer and an operation time, said personal computer having means for selecting each of said sequences in consecutive order and executing the instructions of one state of each sequence before selecting the next successive sequence, and means responsive to a priority instruction incorporated in one of said state descriptors for inhibiting the selection of the next successive sequence, and for executing the instructions incorporated in successive state descriptors of a single sequence.

2. A system for controlling a NC machine comprising, in combination, a personal computer having a microprocessor and a memory for storing a program of operations performed by said microprocessor, said program comprising a plurality of sequences, each having a plurality of successive state descriptors, with each of said state descriptors having at least one instruction to be performed by said microprocessor and an operational time, said personal computer having means for each said sequence to identify the location in memory of the current state of such sequence, means for designating one and only one state descriptor of each said sequence as the current state descriptor, means for executing the instructions in said current state descriptor of each sequence in turn, means responsive to the expiration of the said operational time of a state descriptor to designate the next successive state as the current state in that sequence, means responsive to a priority start instruction in a state descriptor for successively executing the instructions in successive state descriptors of the same sequence until a priority halt instruction is recognized, and thereafter resuming the execution of the instructions of one state from each successive sequence.

3. Apparatus according to claim 2, including an auxillary microprocessor connected to said personal computer and controlled by serial communication under the direction of the operating system of said personal computer, said auxillary microprocessor having a memory with a stored program of operations for controlling said microprocessor, the stored program of operations for said auxillary microprocessor being organized in plural sequences of said state descriptors, and said auxillary microprocessor having means for designating one and only one state descriptor of each said sequence as the current state descriptor, means for executing the instructions of only the current state descriptor of each sequence in turn, means for designating the next successive state descriptor of each sequence as the current state descriptor at the expiration of the operational time of the current state descriptor, and means responsive to the recognition of a priority instruction in a state descriptor for executing the instructions of successive state descriptors in a single one of said sequences.

* * * * *